US007234670B1

(12) United States Patent
Gretz et al.

(10) Patent No.: US 7,234,670 B1
(45) Date of Patent: Jun. 26, 2007

(54) OUTLET POST FOR HIGH AND LOW VOLTAGE SERVICE

(75) Inventors: Thomas J. Gretz, Clarks Summit, PA (US); John Ofcharsky, Olyphant, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/264,483

(22) Filed: Nov. 1, 2005

Related U.S. Application Data

(63) Continuation of application No. 10/755,936, filed on Jan. 13, 2004, which is a continuation-in-part of application No. 10/328,318, filed on Dec. 23, 2002, now Pat. No. 6,779,764, which is a continuation-in-part of application No. 10/253,185, filed on Sep. 24, 2002, now Pat. No. 6,585,221, which is a continuation-in-part of application No. 10/112,563, filed on Mar. 28, 2002, now Pat. No. 6,752,362, which is a continuation-in-part of application No. 09/860,064, filed on May 17, 2001, now abandoned.

(51) Int. Cl.
*F16M 3/00* (2006.01)

(52) U.S. Cl. ......................... 248/156; 248/545; 174/37

(58) Field of Classification Search ................ 248/156, 248/530, 545, 87, 85; 362/431, 382; 174/37, 174/38, 45 R See application file for complete search history.

(56) References Cited

U.S. PATENT DOCUMENTS 3,435,124 A 3/1969 Channell
3,466,379 A * 9/1969 Lohman ...................... 174/38
3,585,456 A * 6/1971 Phillips, Jr. ................ 361/663
3,652,779 A * 3/1972 Grinols ........................ 174/38
4,025,825 A * 5/1977 Shrader ...................... 361/670
4,519,657 A 5/1985 Jensen
4,768,139 A 8/1988 Poppenheimer
4,793,111 A * 12/1988 Shewchuk .................. 52/298
4,858,877 A 8/1989 Carter
5,586,742 A 12/1996 Carter

* cited by examiner

*Primary Examiner*—Anita King

*Assistant Examiner*—Steven Marsh

(57) ABSTRACT

A mounting device for supplying both high and low voltage services in an outdoor setting. One end of the mounting device is adapted to be anchored securely in the ground. A post extending from the ground includes a first electrical box for housing high voltage electrical connections and devices and a second electrical box for housing low voltage connections and devices. If desired by the installer, the mounting device can be configured to provide a single electrical box, which can include either high or low voltage. The top of the mounting device is adapted to accept a light fixture. The ground-anchored portion of the mounting device includes a large entryway to allow a large passageway for lead in of electrical cables. Integral projections extending from the mounting device enable secure anchoring to the ground. The mounting device is molded in one-piece and includes a knockout plate for providing a large electrical enclosure and a voltage separator for dividing the enclosure into separate high and low voltage electrical boxes.

15 Claims, 9 Drawing Sheets

OUTLET POST FOR HIGH AND LOW VOLTAGE SERVICE

This application is a Continuation of U.S. patent application Ser. No. 10/755,936 filed Jan. 13, 2004 and still pending, which was a Continuation-In-Part of U.S. patent application Ser. No. 10/328,318 filed Dec. 23, 2002 and now U.S. Pat. No. 6,779,764, which was a Continuation-In-Part of U.S. patent application Ser. No. 10/253,185 entitled "Garden Post", filed Sep. 24, 2002 and now U.S. Pat. No. 6,585,221, which in turn is a Continuation-In-Part of U.S. patent application Ser. No. 10/112,563 entitled "Outdoor Garden Post", filed Mar. 28, 2002 and now U.S. Pat. No. 6,752,362, which in turn is a Continuation-In-Part of U.S. patent application Ser. No. 09/860,064 entitled "Landscape Fixture Support Post", filed May 17, 2001 and now abandoned.

FIELD OF THE INVENTION

The present invention relates to the field of outdoor ground-level fixtures and electrical devices, and more particularly to an in-ground support post that enables mounting of both high and low voltage components in a single mounting post.

BACKGROUND OF THE INVENTION

In-ground outlet posts have been disclosed in U.S. application Ser. Nos. 10/755,936 and 09/860,064 and in U.S. Pat. Nos. 6,779,764, 6,585,221, and 6,752,362, commonly owned by the assignee of the present invention, the contents of which are referred to herein and incorporated herein in this specification in their entirety.

U.S. patent application Ser. No. 09/860,064, entitled "Landscape Fixture Support Post", filed May 17, 2001 and now abandoned, disclosed a mounting device for mounting a lighting fixture in an outdoor setting. The mounting device included a hollow cylindrical post. The lower portion of the post included integral projections to enable easy anchoring in the ground and a wide entryway for electrical supply cable. The radial projections, being integral with the post body, were less likely to separate from the post than stabilizer devices held by fasteners, as is typical of prior art posts. The post provided a top fitting for mounting a light fixture and a side port to provide access to the interior of the post for completing wiring connections.

U.S. Pat. No. 6,752,362 improved upon the design of an outdoor mounting device by providing an electrical junction box having a top wall and four side walls integral with the post. The mounting device provided a secure junction box for mounting an electrical device, such as an outlet receptacle in addition to a lighting fixture. Wiring connections to both the electrical device and the lighting fixture could therefore be completed within a secure electrical junction box. By isolating the internal wiring connections to both the device and fixture within a secure junction box, the wiring connections were thus better protected from ground moisture and other environmental hazards. The mounting device also enabled the junction box to accept all standard wall-mounted electrical devices, increasing its functionality.

U.S. Pat. No. 6,585,221 improved upon the functionality of the outdoor garden post by disclosing a mounting device for mounting a fixture at a user-selectable height in an outdoor setting. The mounting device was modular in nature, with the installer able to add various modules to raise the height of a light fixture and electrical device to a desired level. The mounting device also included a secure electrical junction box for enclosing and protecting wiring connections.

U.S. application Ser. Nos. 10/328,318 and 10/755,936 improved the functionality of in-ground outlet posts by disclosing mounting devices that provided an elongated electrical box capable of accommodating several electrical devices.

Although the aforementioned disclosures improved upon prior art in-ground mounting devices, the mounting device was limited to supporting either a high voltage or low voltage device. The electrical code specifies that high and low voltage devices cannot be installed in the same box. Thus, although two high voltage devices or two low voltage devices could be supported by those mounting devices having an elongated electrical box, the mounting devices were inadequate in those situations in which the user wished to install both high and low voltage services in one mounting device.

What is needed therefore, is a device that is capable of anchoring in the ground and supporting both high and low voltage electrical devices. Additionally, the mounting device should provide the improved features of the aforementioned commonly owned disclosures, including a secure electrical junction box for isolating wiring connections from environmental hazards, integral projections to improve anchoring to the ground, and a wide lower cable entryway to allow easy access for underground cables. The mounting device should also be stable, durable, inexpensive to manufacture, easy to install, and easy to maintain.

OBJECTS OF THE INVENTION

A first advantage of the present invention is that it provides a mounting device that will accept both high and low voltage electrical devices.

A second advantage exhibited by the mounting device of the present invention is that it can be easily anchored to the ground.

Additionally, the fixture-mounting device is stable, durable, easily maintained and accessed after installation, and is easy and inexpensive to manufacture.

These, and other objects, will become readily apparent to one of skill in the art having regard for this disclosure.

BRIEF DESCRIPTION OF THE INVENTION

The invention is a mounting device for supplying both high and low voltage services to an outdoor area. One end of the mounting device is anchored in the ground. A post extending from the ground includes a first electrical box for housing high voltage electrical connections and devices and a second electrical box for housing low voltage connections and devices. If desired by the installer, the mounting device can be configured to provide only one electrical box, which can include either high or low voltage. The top of the mounting device is adapted to accept a light fixture. The ground-anchored portion of the mounting device includes a large entryway to allow a large passageway for lead in of electrical cables. Integral projections extending from the mounting device enable secure anchoring to the ground. The mounting device is molded in one-piece and includes a knockout plate for providing a large electrical enclosure and a voltage separator for dividing the enclosure into high and low voltage electrical boxes.

REFERENCE NUMERALS USED IN THE SPECIFICATION AND DRAWINGS

Figure 1:
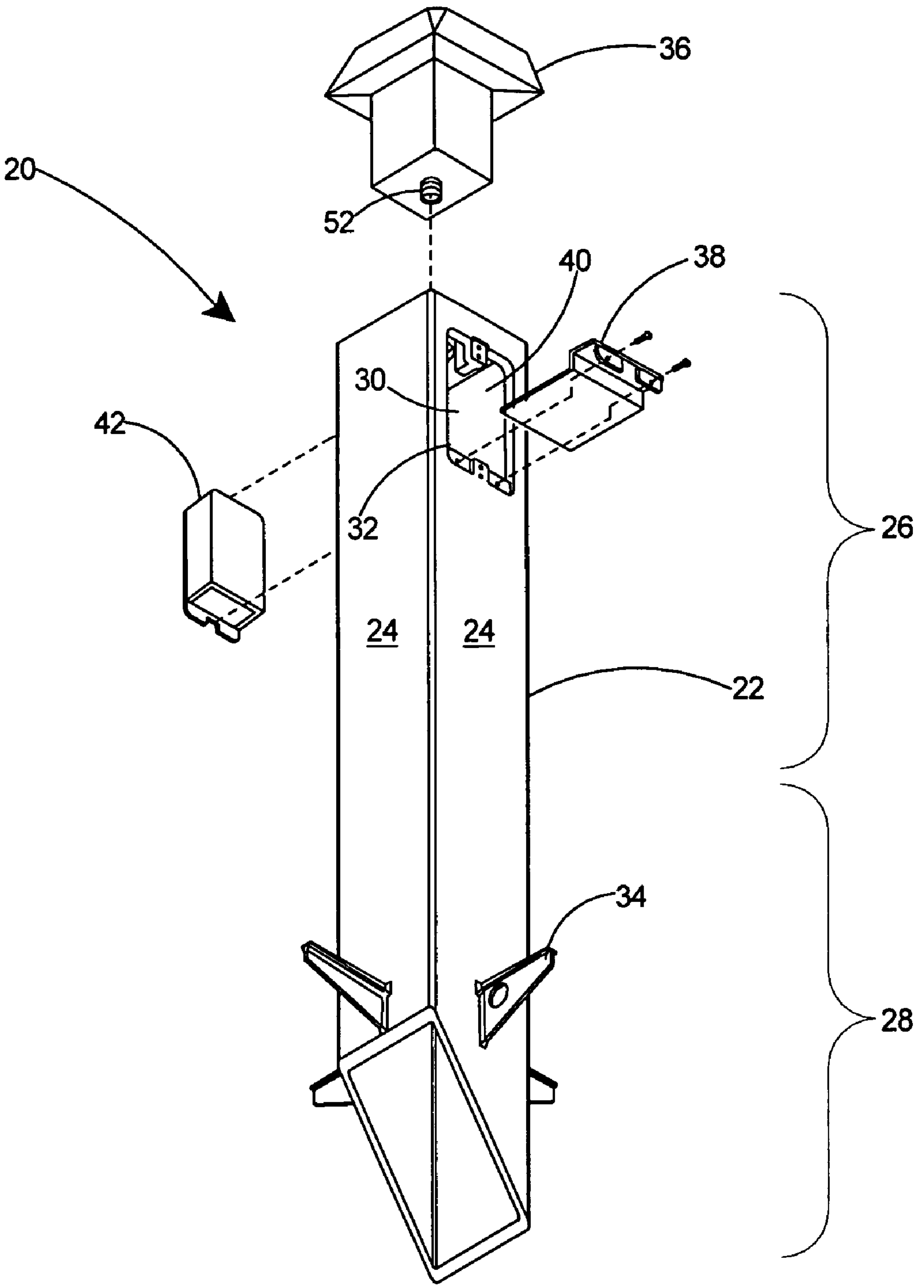
FIG. 1 is a perspective view of a preferred embodiment of the mounting device of the present invention.

| Part Number | Description |
|---|---|
| 20 | mounting device |
| 22 | tubular body |
| 24 | side wall |
| 26 | top portion |
| 28 | bottom portion |
| 30 | opposing openings |
| 30A | first opening |
| 30B | second opening |
| 32 | lower end of opening |
| 34 | stabilizer bar |
| 36 | light fixture |
| 38 | knockout plate |
| 40 | electrical box or enclosure |
| 42 | voltage separator |
| 44 | integral fillet |
| 46 | joint |
| 48 | top wall |
| 50 | bushing |
| 52 | nipple |
| 54 | thick wall portion |
| 56 | bore |
| 57 | top edge of stabilizer bar |
| 58 | stiffening rib |
| 60 | outer portion of knockout plate |
| 62 | guiding aperture |
| 64 | inner portion of knockout plate |
| 65 | boss integral with knockout plate |
| 66 | receiving aperture |
| 68 | outer horizontal portion of knockout plate |
| 70 | channel |
| 72 | inner horizontal portion of knockout plate |
| 74 | first knockout portion |
| 76 | second knockout portion |
| 78 | side wall of voltage separator |
| 80 | top wall of voltage separator |
| 82 | back wall of voltage separator |
| 84 | open bottom of voltage separator |
| 86 | front edge of voltage separator |
| 87 | downward depending tab |
| 88 | integral lip of voltage separator |
| 89 | slot |
| 90 | fastening arrangement |
| 92 | fastener for knockout plate |
| 94 | aperture |
| 96 | cover member |
| 98 | fastener for cover of low voltage electrical box |
| 100 | aperture |
| 102 | first electrical box |
| 104 | second electrical box |
| 106 | duplex outlet |
| 108 | fastener for electrical device |
| 110 | faceplate |
| 112 | fastener for faceplate |
| 114 | cable TV jack |
| 116 | coax cable |
| 118 | high voltage cable |
| 120 | bottom end of mounting device |
| 122 | opening in bottom end |
| 124 | boss |
| 126 | top end of opening in tubular body |
| 128 | aperture in lip of voltage separator |

DETAILED DESCRIPTION

As this invention may be more easily explained by reference to the attached drawings, it should be noted that the figures are representative and exemplary of the invention only, and should not be construed as limiting the scope of the invention in any way.

The present invention consists of a mounting device for providing electrical services in an outdoor area. The mounting device or garden post provides a secure platform for housing both high and low voltage electrical devices therein. A house owner may, for example, wish to provide lighting, high voltage electrical service, and cable TV service in an outdoor setting, such as a patio. The mounting device of the present invention allows a homeowner to satisfy these needs by mounting a high voltage light fixture, a high voltage outlet, and a low voltage cable TV connection in a single mounting device. The mounting device can be easily anchored in the ground near the patio, high and low voltage electrical supply run to the mounting device, and the high and low voltage components secured therein. The mounting device provides a weatherproof housing for enclosing the various electrical devices therein.

Referring to FIG. 1, the preferred embodiment of a mounting device 20 according to the present invention includes an elongated one-piece tubular body 22 with side walls 24, a top portion 26, and a bottom portion 28. The side walls 24 include two opposing openings 30, one of which is in view in the figure, in the top portion 26 of the mounting device 20. Each of the openings include lower ends 32. The bottom portion 28 of the mounting device 20 includes integral stabilizer bars 34, which are typically formed as part of the one-piece body 22 in a molding operation. A light fixture 36 can be secured to the top portion 26 of the mounting device 20. The mounting device includes a knockout plate 38 that is inserted into one of the openings 30 to span substantially the distance between the opposing openings at the lower ends 32 and define an electrical box 40 within the top portion 26. A voltage separator 42 is in alignment with the opening (not shown) on the opposite side of the mounting device 20.

Figure 2:
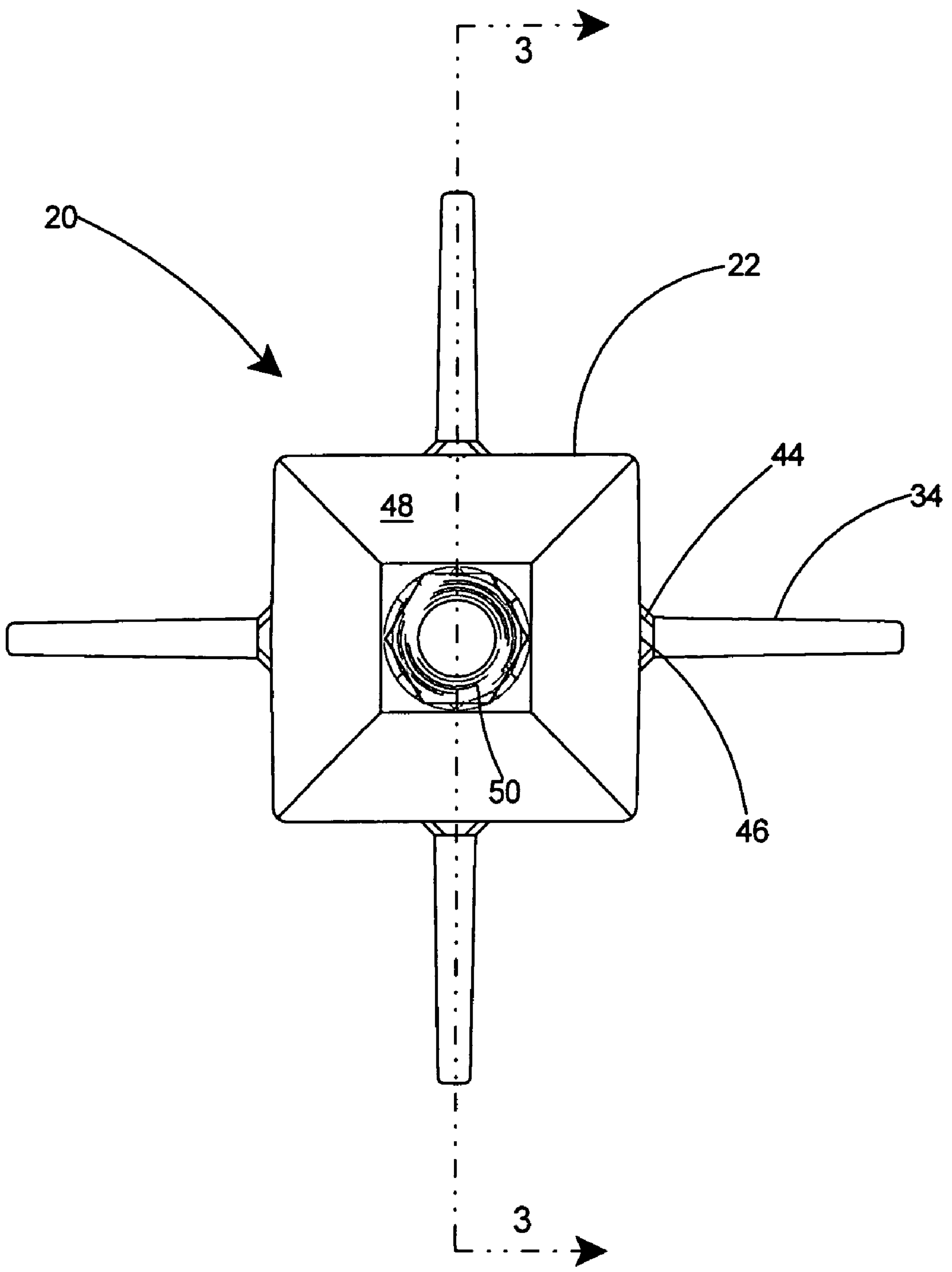
FIG. 2 is a top view of the mounting device shown in FIG. 1.

With reference to FIG. 2, the stabilizer bars 34 include integral fillets 44 which are formed in the molding of the mounting device 20. The integral fillets 44 increase the strength of the joint 46 between the stabilizer bar 34 and the tubular body 22. The mounting device 20 further includes a top wall 48 and an internally threaded bushing 50 for accepting a light fixture (not shown). The one-piece tubular body 22 includes a substantially square cross section. As shown in FIG. 1, the light fixture 36 typically includes an externally threaded nipple 52 for engagement with the threaded bushing on the mounting device.

Figure 3:
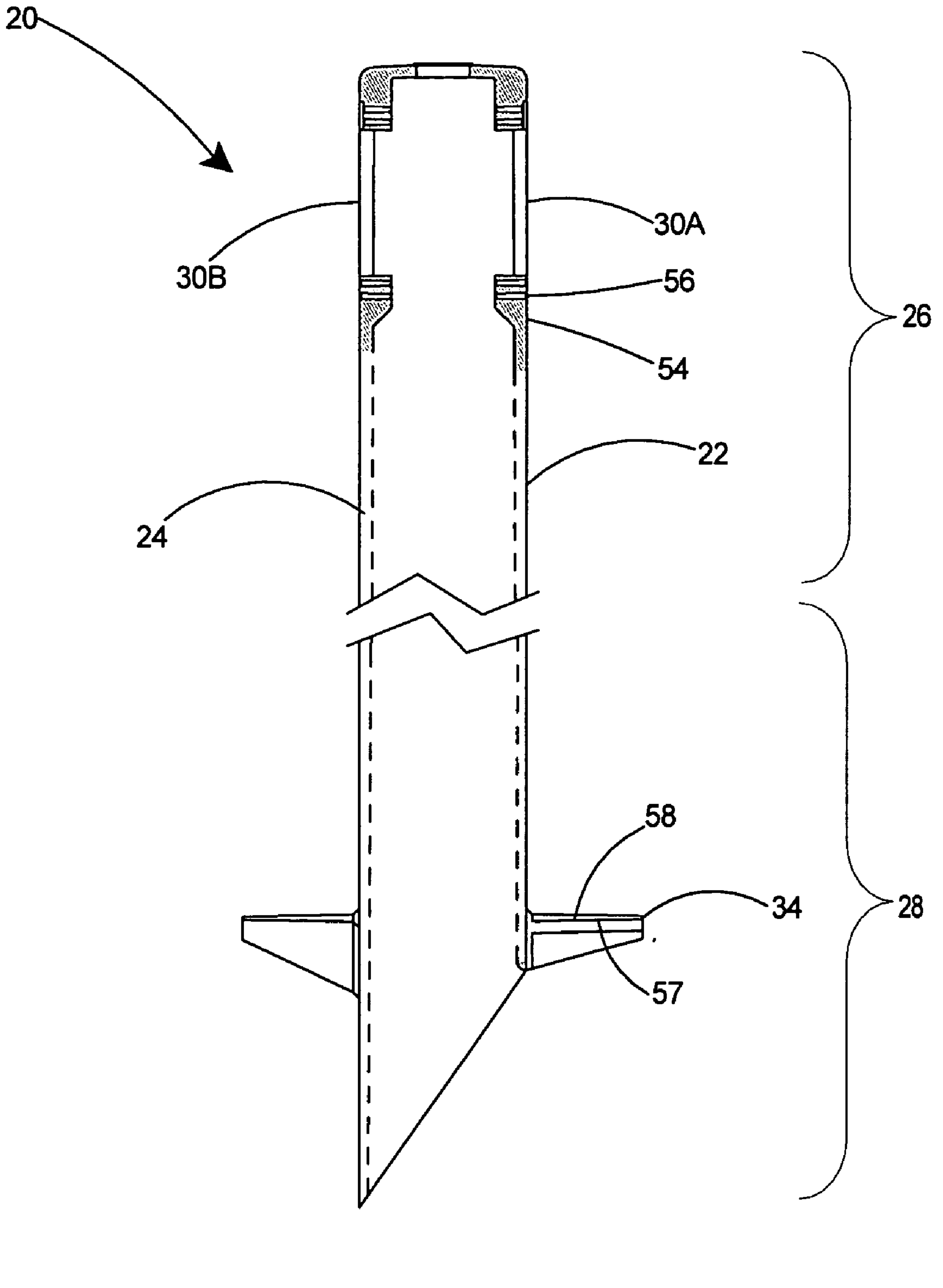
FIG. 3 is a sectional view of the mounting device taken along line 3-3 of FIG. 2.

The sectional view of FIG. 3 depicts the one-piece tubular body 22 portion of the mounting device 20. The tubular body 22 is preferably molded of plastic in one-piece. Two opposing openings 30A, 30B are formed in the top portion 26 of the mounting device 20, including a first opening 30A and a second opening 30B. The side walls 24 include thick wall portions 54, which have a plurality of bores 56, formed therein. Each stabilizer bar 34 includes a top edge 57 and an integral stiffening rib 58 extending along the top edge 57. The integral stiffening rib 58 strengthens the stabilizer bar 34 and reduces the possibility of the stabilizer bars being bent in a sideways direction.

Figure 4:
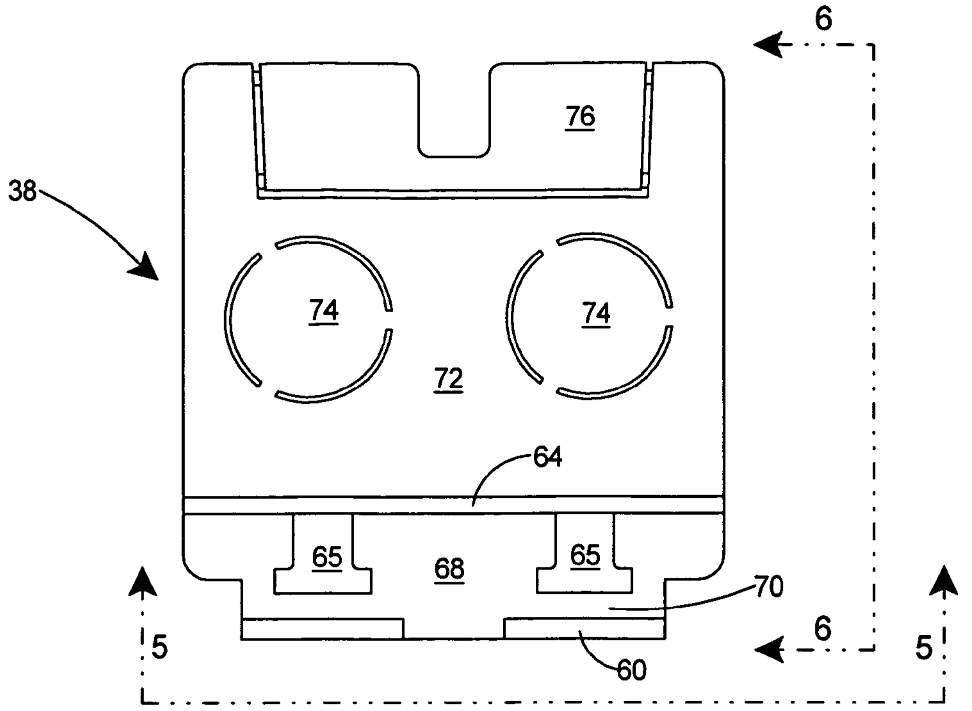
FIG. 4 is a plan view of a knockout plate used with the mounting device of FIG. 1.
Figure 5:
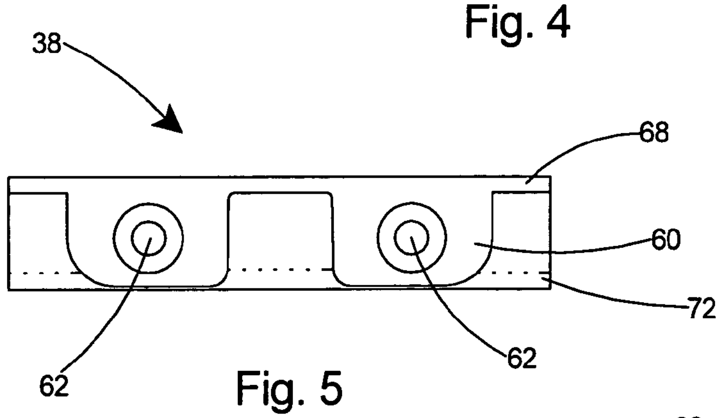
FIG. 5 is an end view of the knockout plate taken along line 5-5 of FIG. 4.
Figure 6:
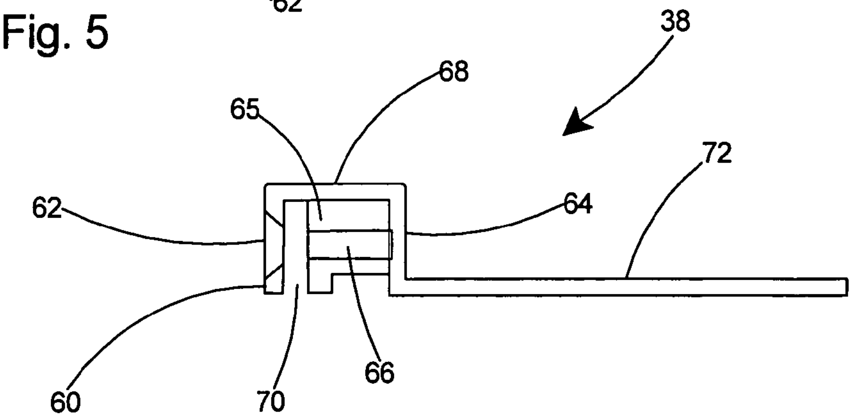
FIG. 6 is a side view of the knockout plate taken along line 6-6 of FIG. 4.

Referring to FIGS. 4-6, the knockout plate 38 includes an outer portion 60 including a guiding aperture 62 therein, an inner portion 64 including an integral boss 65 having a receiving aperture 66 therein, an outer horizontal portion 68 connecting the outer portion 60 and the inner portion 64 and defining a channel 70 therebetween, and an inner horizontal portion 72. The guiding apertures 62 are at an angle to allow any fasteners inserted therein to be countersunk within the outer portion 60. The knockout plate 38 further includes first knockout portions 74 and a second knockout portion 76 that may be removed from the knockout plate 38 to allow passage of electrical wiring therethrough.

Figure 7:
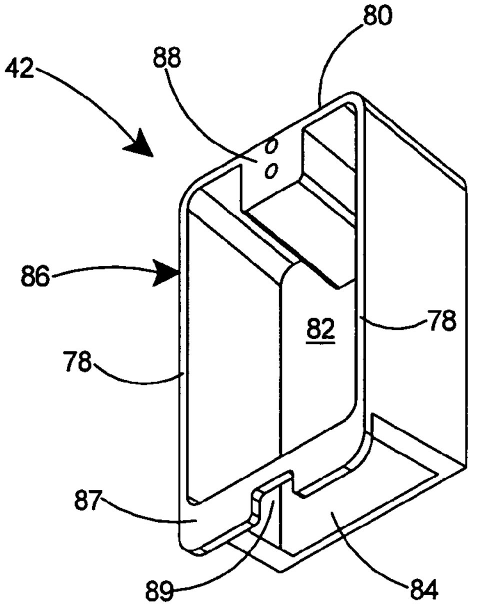
FIG. 7 is a perspective view of the voltage separator member shown in FIG. 1.
Figure 8:
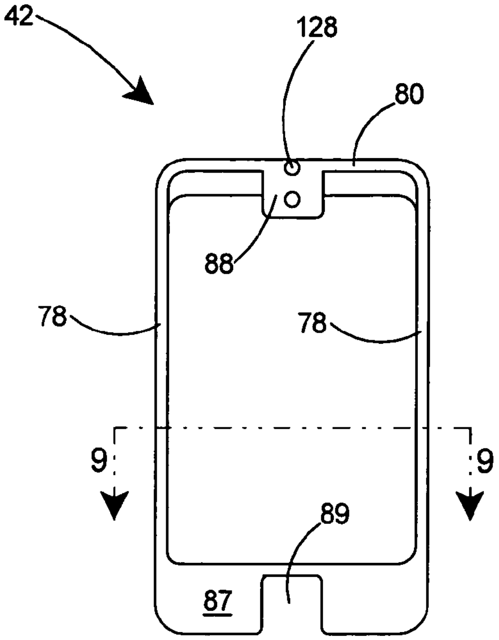
FIG. 8 is a front view of the voltage separator of FIG. 7.
Figure 9:
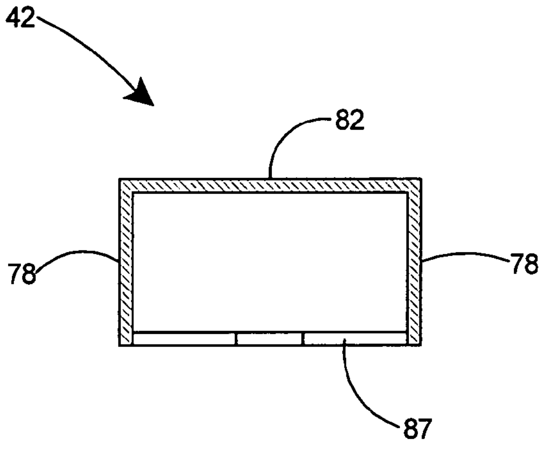
FIG. 9 is a sectional view of the voltage separator taken along line 9-9 of FIG. 8.

With reference to FIGS. 7-9, the voltage separator 42 includes two side walls 78, a top wall 80, a back wall 82, an open bottom 84, and a front edge 86. The voltage separator 42 further includes an integral lip 88 extending from the top wall 80, a downward depending tab 87 at the front edge 86 of the open bottom 84, and a slot 89 in the downward depending tab 87.

Figure 10:
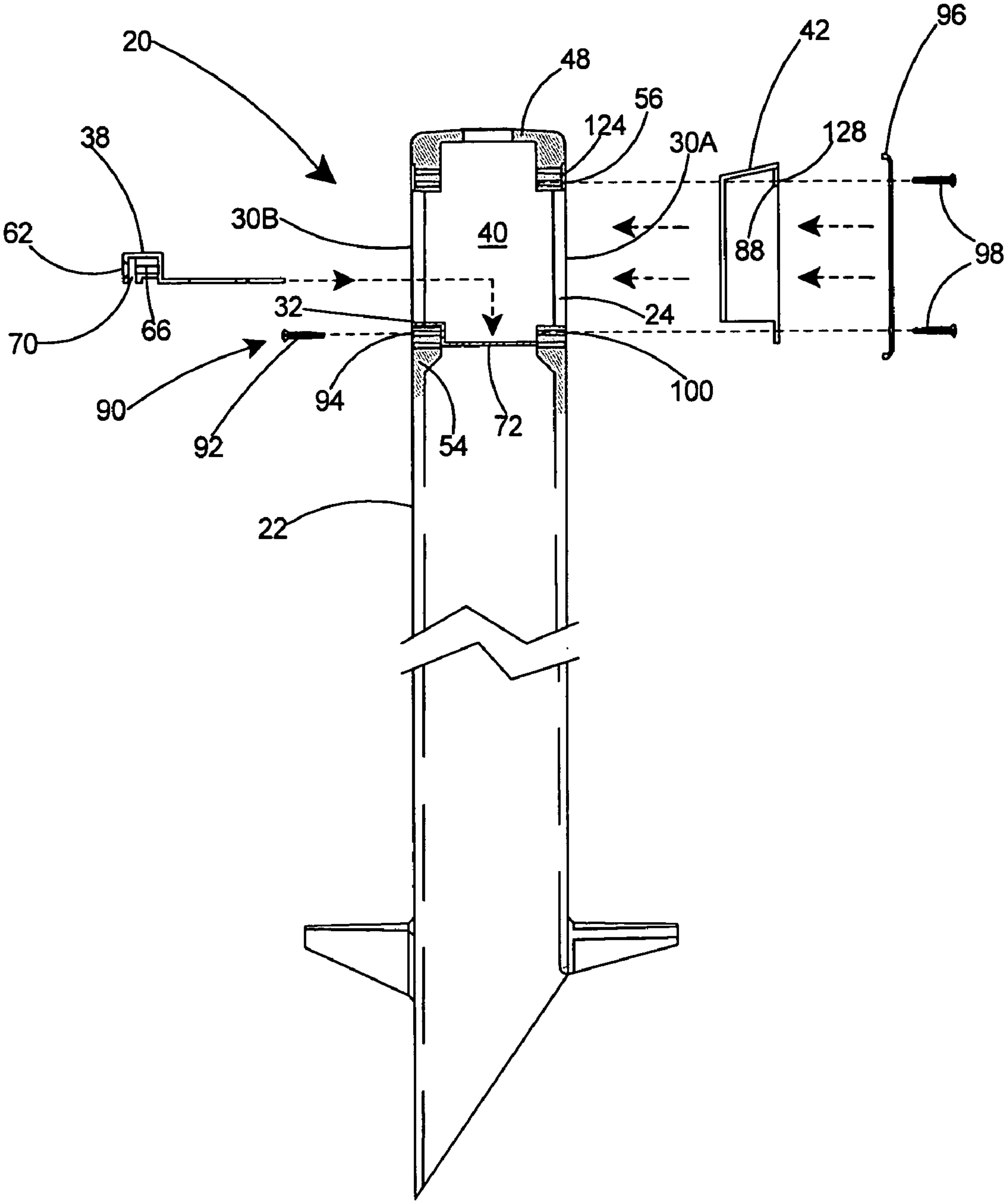
FIG. 10 is a sectional view of the mounting device of FIG. 3 with a knockout plate and voltage separator in alignment to be installed therein.

As shown in FIG. 10, the knockout plate 38 is inserted into the second opening 30B of the tubular body 22 with the channel 70 of the knockout plate 38 placed over a thick wall portion 54 of the tubular body 22. The knockout plate 38 is then secured thereto by the fastening arrangement 90. The fastening arrangement 90 for securing the knockout plate 38 to the tubular body 22 includes a fastener 92, which is threaded through the guiding aperture 62 in the knockout plate 38, the aperture 94 at the lower end 32 of the second opening 30B of the tubular body 22, and the receiving aperture 66 in the knockout plate 38. With the knockout plate 38 secured to the tubular body 22, the inner horizontal portion 72 of the knockout plate 38 substantially closes the tubular body 22 and defines an electrical box 40. The electrical box 40 is bound by the side walls 24 of the tubular body 22, the top wall 48 of the tubular body 22, and the knockout plate 38. The large electrical box 40 thus formed may be used for high voltage devices and their wiring connections or for low voltage devices and their wiring connections, but as a consequence of the electrical code, would not be appropriate for housing both high and low voltage components and connections. If the installer prefers to mount both high and low voltage components, a voltage separator 42 would be secured at the first opening 30A as shown. The voltage separator 42 is secured to the tubular body 22 by a cover member 96, which in turn is secured to the tubular body 22 by fasteners 98 secured into apertures 100 as shown.

Figure 11:
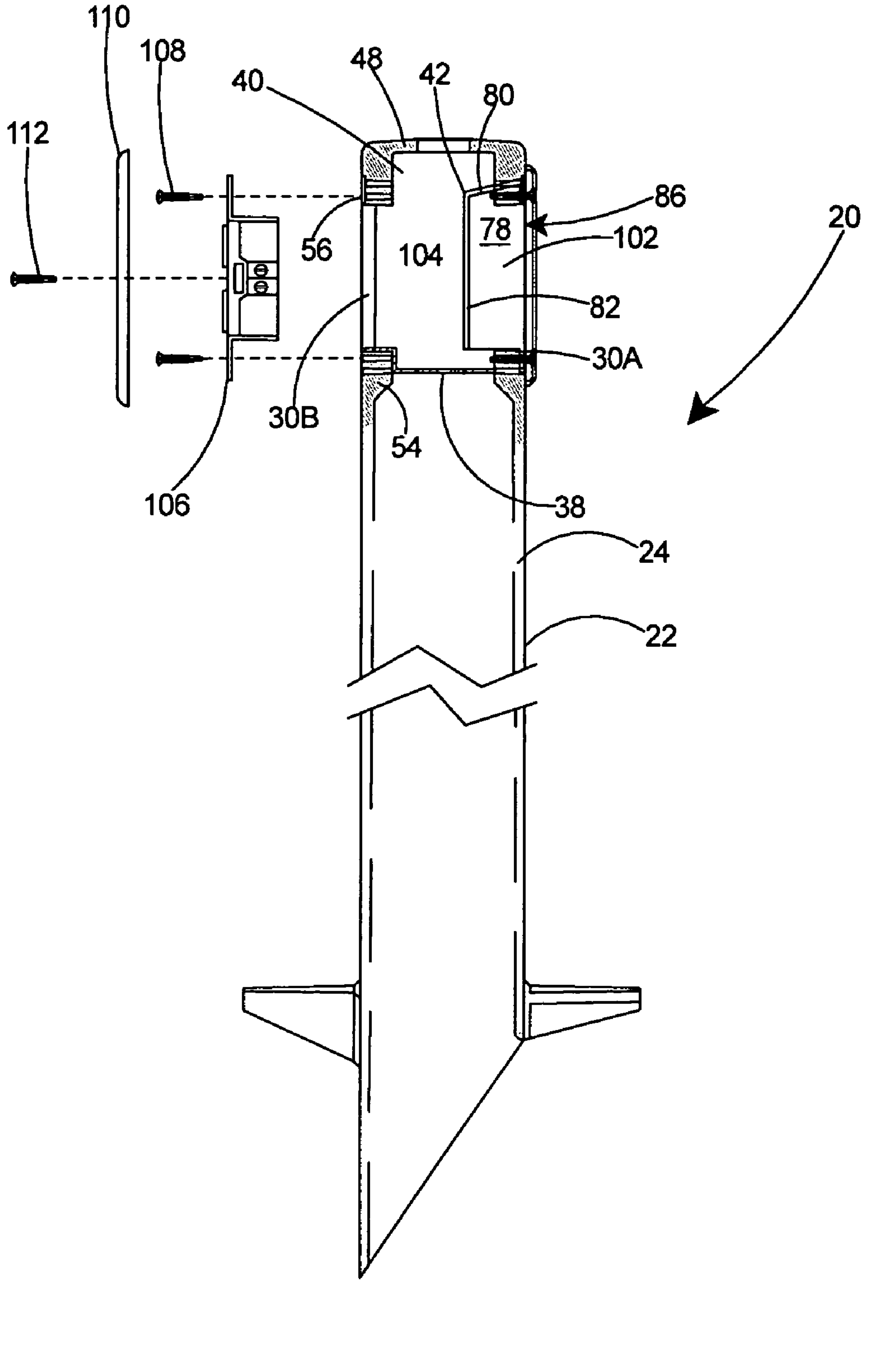
FIG. 11 is a sectional view of a mounting device with a knockout plate secured therein and a voltage separator and high voltage electrical device in alignment to be installed therein.

After the knockout plate 38 and voltage separator 42 are secured to the tubular body 22 as shown in FIG. 11, the voltage separator 42 divides the large electrical enclosure 40 into a first or low voltage electrical box 102 and a second or high voltage electrical box 104. The first electrical box 102 is defined as the enclosure bounded by the side walls 78, top wall 80, and back wall 82 of the voltage separator 42 and on the bottom by the knockout plate 38. The second electrical box 104 is defined as the enclosure bounded by the side walls 24 and top wall 48 of the tubular body 22, the knockout plate 38, and the back wall 82 of the voltage separator 42. The second opening 30B of the tubular body 22 is adapted to accept a wall-mount high voltage electrical device, such as the duplex outlet 106 shown in FIG. 11. Fasteners 108 are tightened into the bores 56 in the thick wall portions 54 of the tubular body 22 to secure the duplex outlet 106 thereto. A standard wall-mount faceplate 110 is secured by fasteners 112 over the duplex outlet 106 to seal second opening 30B over the second electrical box 104.

Figure 12:
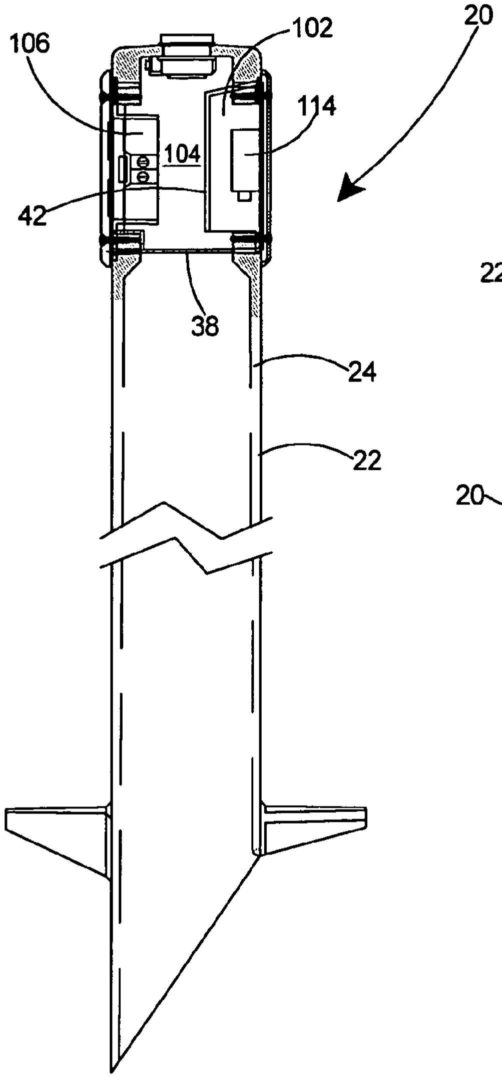
FIG. 12 is a sectional view of a mounting device with a voltage separator and high voltage electrical device secured therein.
Figure 12A:
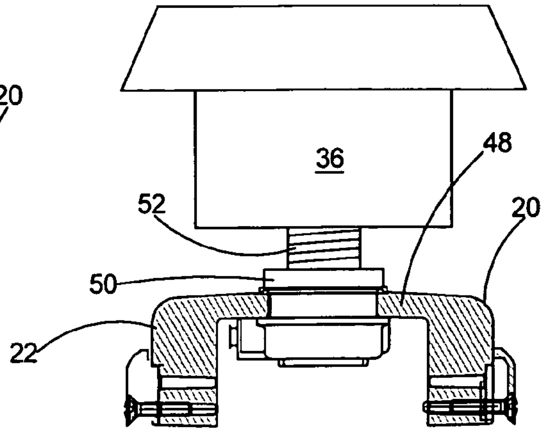
FIG. 12A is a detailed view of a light fixture secured to the top portion of the mounting device of FIG. 12.

With the duplex outlet 106 secured to the tubular body 22, as shown in FIG. 12, any typical low voltage electrical device, such as a cable phone jack, computer data jack, or cable TV jack 114, could be installed within the first or low voltage electrical box 102. Additionally, as shown in FIG. 12A, a light fixture 36 can be secured to the mounting device 20 by screwing the nipple 52 on the light fixture 36 into the bushing 50 secured in the top wall 48 of the tubular body 22.

Figure 12B:
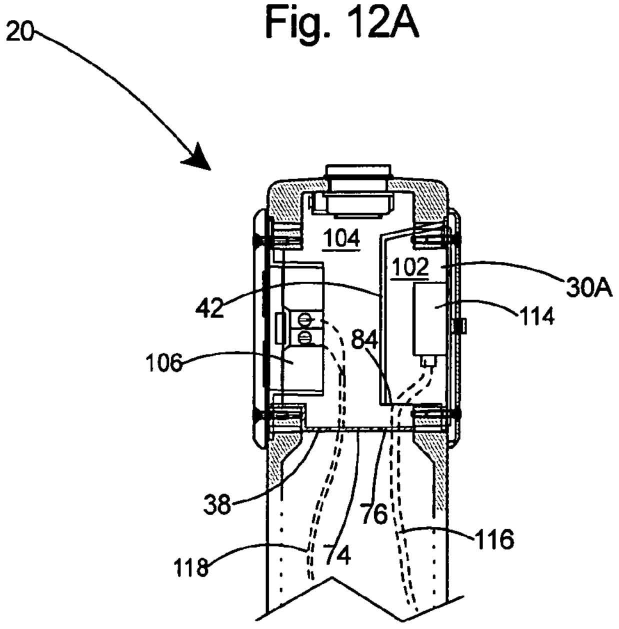
FIG. 12B is a detailed view of the high and low voltage electrical enclosures of the mounting device of FIG. 12.

With reference to FIG. 12B, with the voltage separator 42 secured in the first opening 30A, the open bottom 84 of the voltage separator 42 overlaps the second knockout portion 76 in the knockout plate 38. Low voltage line such as the coax cable 116 shown is routed through the second knockout portion 76 and through the open bottom 84 of the voltage separator 42 to the cable TV jack 114 that is secured within the first electrical box 102. High voltage cable 118 is routed through the first knockout portion 74 and into the second electrical box 104 to supply line current to the duplex outlet 106.

Figure 13:
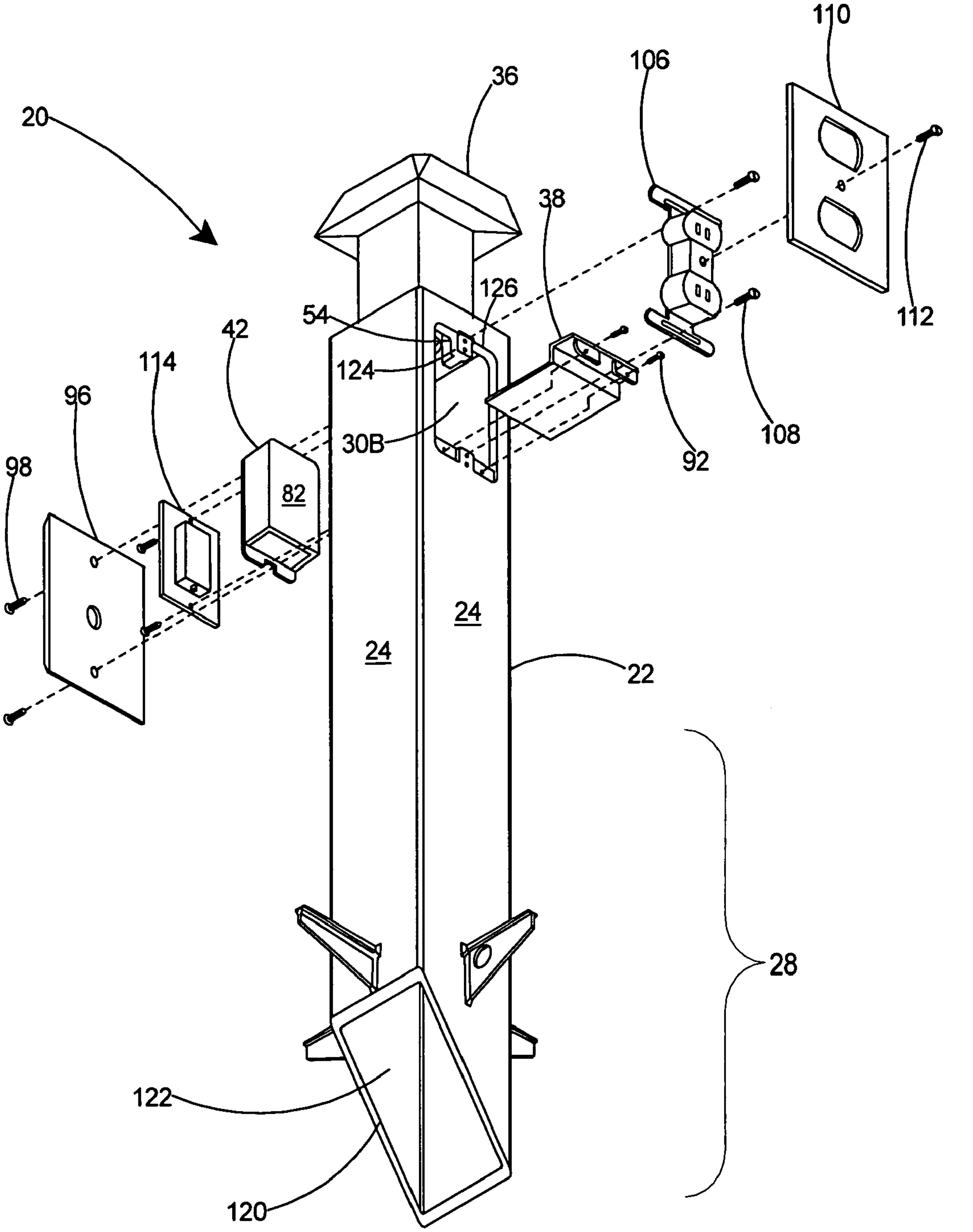
FIG. 13 is a perspective view of a mounting device with a knockout plate, voltage separator, and high voltage electrical device exploded away and in alignment to be installed therein.

With reference to FIG. 13, the mounting device 20 includes the tubular body 22 and the knockout plate 38, duplex outlet 106, and faceplate 110 in alignment with the second opening 30B and ready to be secured therein to create a high voltage electrical box therein. In alignment with the opposing opening (not shown) on the opposite side of the mounting device 20 are shown the voltage separator 42 with the back wall 82 facing the tubular body 22, the low voltage device 114, and a cover member 96. A light fixture 36 is shown secured to the top of the mounting device. As shown in FIG. 13, the bottom portion 28 of the tubular body 22 includes an open bottom end 120 that is at a sharp angle to the side walls 24. The bottom end 120 of the mounting device 20 is cut at a sharp angle to provide a substantially wide and long bottom opening 122 therein for receipt of cables. As further shown in FIG. 13, a boss 124 is included at the thick wall portion 54 on the tubular body 22 at the top end 126 of the second opening 30B, the boss 124 including a bore 56 therein.

Referring to FIG. 8, the integral lip 88 extending from the top wall 80 of the voltage separator 42 includes an aperture 128 therein. When aligned with the tubular body 22, as shown in FIG. 10, the bore 56 in the boss 124 on the tubular body 22 is aligned with the aperture 128 in the lip 88 of the voltage separator 42. After the voltage separator 42 is inserted within the first opening 30A, as shown in FIG. 11, the front edge 86 is flush with the side wall 24 of the tubular body 22.

While the invention has been described by reference to the preferred embodiment disclosed herein, the invention is subject to considerable modification and may be tailored to fit the needs of many suitable mounting needs without departing from the scope or spirit of the claims which are appended hereto.

What is claimed is:

1. A mounting device for providing high and low voltage service in an outdoor setting comprising:

an elongated one-piece tubular body having side walls, a top portion including a top wall, and a bottom portion;

two opposing openings in said side walls of said top portion, said openings having lower ends;

a knockout plate spanning substantially the distance between said opposing openings at said lower ends and defining an electrical box therein, said knockout plate including one or more knockout portions therein, said knockout portions being removable from said knockout plate;

said electrical box defined by said side walls of said body, said top wall of said body, and said knockout plate;

a voltage separator secured at a first of said opposing openings, said voltage separator dividing said electrical box into a first electrical box and a second electrical box, said voltage separator including two side walls, a top wall, a back wall, and an open bottom; and said open bottom in said voltage separator secured at said first opening overlaps at least one of said knockout portions in said knockout plate.

2. The mounting device of claim 1 wherein said one-piece tubular body includes a substantially square cross section.

3. The mounting device of claim 1 wherein said bottom portion of said one-piece tubular body includes integral stabilizer bars extending therefrom.

4. The mounting device of claim 1 wherein said bottom portion of said tubular body includes a bottom end; and said bottom end is cut at an angle to provide a substantially wide and long bottom opening therein for receipt of cables.

5. The mounting device of claim 3 wherein said integral stabilizer bars include top edges; and an integral stiffening rib extending along each of said top edges.

6. The mounting device of claim 1 wherein said knockout plate includes an outer portion including a guiding aperture therein;

an inner portion including a receiving aperture therein;

an outer horizontal portion connecting said outer portion and said inner portion and defining a channel therebetween said outer and inner portions; and an inner horizontal portion substantially closing said tubular body and defining said electrical box.

7. The mounting device of claim 6 wherein said tubular body includes a second of said opposing openings;

an aperture in said tubular body at said lower end of said second opening; and a fastening arrangement for securing said knockout plate to said tubular body.

8. The mounting device of claim 7 wherein said fastening arrangement for securing said knockout plate to said tubular body includes a fastener; and said fastener securing through said guiding aperture in said knockout plate, said aperture at said lower end of said second opening of said tubular body, and said receiving aperture in said knockout plate.

9. The mounting device of claim 1 wherein said tubular body is molded in one piece of plastic.

10. The mounting device of claim 1 wherein said voltage separator includes a front edge;

an integral boss extending from said top wall of said voltage separator;

a downward depending tab at said open bottom; and a slot in said downward depending tab.

11. The mounting device of claim 10 wherein said voltage separator is secured at said first of said openings including said back wall facing said tubular body; and said front edge flush with said side wall of said tubular body.

12. The mounting device of claim 11 including a boss on said tubular body at said top end of said first opening, said boss including a bore therein;

said boss extending from said top wall of said voltage separator including an aperture therein; and said bore in said boss on said tubular body in alignment with said aperture in said boss on said voltage separator.

13. The mounting device of claim 12 including a cover member;

a fastener for securing said cover member to said tubular body; and said fastener securing through said aperture in said boss of said voltage separator and into said bore in said boss of said tubular body.

14. The mounting device of claim 1 including a low voltage electrical box defined by said side walls, said top wall, and said back wall of said voltage separator and said knockout plate.

15. The mounting device of claim 1 including a high voltage electrical box defined by said top wall and said side walls of said tubular body, said back wall of said voltage separator, and said knockout plate.

* * * * *